US007925738B2

(12) United States Patent
Tang et al.

(10) Patent No.: US 7,925,738 B2
(45) Date of Patent: Apr. 12, 2011

(54) ANALYTICAL CACHE PERFORMANCE MODEL FOR A MEDIA SERVER

(75) Inventors: Wenting Tang, Sunnyvale, CA (US); Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2192 days.

(21) Appl. No.: 10/740,276

(22) Filed: Dec. 18, 2003

(65) Prior Publication Data
US 2005/0138165 A1   Jun. 23, 2005

(51) Int. Cl.
*G06F 15/173* (2006.01)
(52) U.S. Cl. ...................................................... 709/224
(58) Field of Classification Search .................. 709/224; 711/118, 133
See application file for complete search history.

(56) References Cited

U.S. PATENT DOCUMENTS

| 7,035,979 B2* | 4/2006 | Azevedo et al. | 711/137 |
| 2002/0007392 A1* | 1/2002 | Buddhikot et al. | 709/203 |
| 2004/0111514 A1* | 6/2004 | Chase et al. | 709/226 |

OTHER PUBLICATIONS

"Analyzing cache performance for video servers" Kim, S Sivasubramaniam, A. Das, C.R. , Aug. 14, 1998 , Architectural and OS Support for Multimedia Applications/Flexible Communication Systems/Wireless Networks and Mobile Computing: Proceedings of the 1998 ICPP Workshops on. pp. 38-47.*
"Measurement and analysis of a streaming-media workload", Chesire,M. Wolman,A. Voelker, G. Levy, H. 2001 USENIX Association. Proceedings of the 3rd conference on USENIX Symposium on Internet Technologies and Systems—vol. 3.*
"Segment-Based Proxy Caching of Multimedia Streams" Wu,K. Yu,P. Wolf,J May 2-5, 2001 WWW10.ACM.*
"Model-Based Resource Provisioning in a Web Service Utility" Doyle, R. Chase, J. Asad, O. Jin, W. Vandat, A. Mar. 2003. USENIX Association. Proceedings of USITS ')#: 4th USENIX Symposium on internet Technologies and systems.*
"Model-Based Resource Provisioning in a Web Service Utility" Doyle, R. Chase, J. Asad, O. Jin, W. Vahdat, A. Mar. 2003. USENIX Association. Proceedings of USITS: 4th Usenix Symposium on internet Technologies and systems.*
Characterizing Locality, Evolution, and Life Span of Accesses in Enterprise Media Server Workloads, Author: Ludmila Cherkasova and Minaxi Gupta, International Workshop on Network and Operating System Support for Digital Audio and Video, Proceedings of the 12th international workshop, ISBN:1-58113-512-2, Published: May 12-14, 2002.*
Almeida, J. et al., "Analysis of Educational Media Server Workloads", Proc. 11th Int'l. Workshop on Network and Operating System Support for Digital Audio and Video (NOSSDAV 2001), Jun. 2001, 10 pages.
Almeida, V. et al., "Characterizing Reference Locality in the WWW", Dept. of Computer Science, Boston University, 22 pages, Dec. 1996.

(Continued)

*Primary Examiner* — Benjamin R Bruckart
*Assistant Examiner* — Noel Beharry

(57) ABSTRACT

According to at least one embodiment, a method comprises receiving a session trace log identifying a plurality of sessions accessing streaming media files from a media server. The method further comprises deriving from the session trace log a segment trace log that identifies for each of a plurality of time intervals the segments of the streaming media files accessed, and using the segment trace log to develop an analytical cache performance model. According to at least one embodiment, a method comprises receiving workload information representing client accesses of streaming media files from a media server, and using an analytical cache performance model to compute a cache hit ratio for the media server under the received workload.

18 Claims, 6 Drawing Sheets

OTHER PUBLICATIONS

Breslau, L. et al., "Web Caching and Zipf-like Distributions: Evidence and Implications", IEEE INFOCOM, vol. XX, No. Y, Month 1999, pp. 1-9.

Chase, J. et al., "Managing Energy and Server Resources in Hosting Centers", Department of Computer Science, Duke University, 14 pages, Dec. 2001.

Cherkasova, L. et al., "Characterizing Temporal Locality and its Impact on Web Server Performance", Hewlett-Packard Laboratories, Palo Alto, 8 pages, Oct. 2000.

Cherkasova, L. et al., "Sizing the Streaming Media Cluster Solution for a Given Workload", Hewlett-Packard Laboratories, Palo Alto, 8 pages, Apr. 2004.

Cherkasova, L. et al., "Characterizing Locality, Evolution, and Life Span of Accesses in Enterprise Media Server Workloads", Hewlett-Packard Laboratories, Palo Alto, NOSSDAV '02, May 12-14, 10 pages.

Cherkasova, L. et al., "Building a Performance Model of Streaming Media Applications in Utility Data Center Environment", Hewlett-Packard Laboratories, Palo Alto, 8 pages, May 2003.

Chesire, M. et al., "Measurement and Analysis of a Streaming-Media Workload", Dept. of Computer Science and Engineering, Univ. of Washington and University of California, 12 pages, Mar. 2001.

Jin, S. et al., "Temporal Locality in Web Request Streams", Computer Science Dept., Boston University, 2 pages, 1999.

Tang, W. et al., "MediSyn: A Synthetic Streaming Media Service Workload Generator", Hewlett-Packard Laboratories, Palo Alto, NOSSDAV '03, 10 pages.

Tang, W. et al., "Long-term Streaming Media Server Workload Analysis and Modeling", Hewlett-Packard Laboratories, Palo Alto, Jan. 29, 2003, 22 pages.

"Data center virtualization benefits", [Online] Retrieved on Dec. 12, 2003 Retrieved from: http://h71028.www7.hp.com/enterprise/cache/4239-0-0-0-121.aspx 2 pages.

"Data center virtualization architecture" [Online] Retrieved Dec. 12, 2003 Retrieved from: http://h71028.www7.hp.com/enterprise/cache/4264-0-0-0-121.aspx 2 Pages.

"Data center virtualization overview" [Online] Retrieved Dec. 12, 2003 Retrieved from: http://h71028.www7.hp.com/enterprise/cache/4265-0-0-0-121.aspx 2 Pages.

"HP Utility Data Center" [Online] Retrieved Dec. 12, 2003 Retrieved from: http://h71028.www7.hp.com/enterprise/cache/4269-0-0-0-121.aspx?jumpid= go/hpudc—2 pages.

* cited by examiner

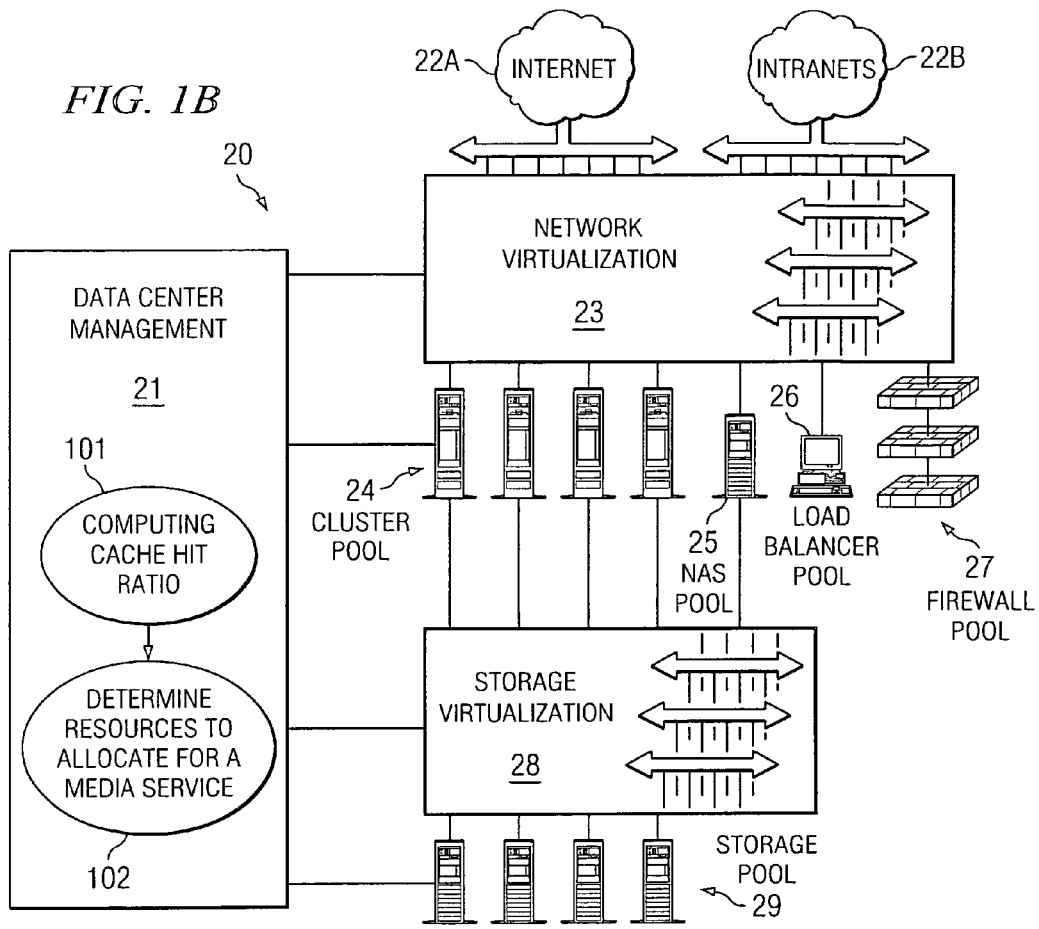
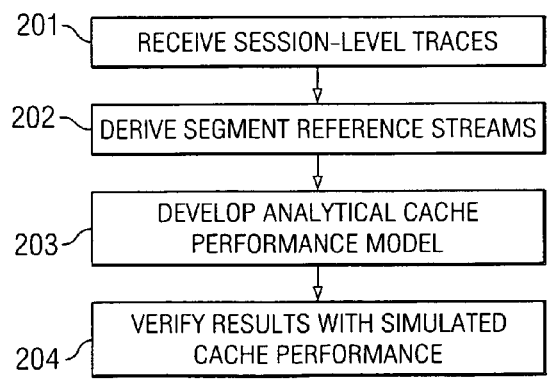

*FIG. 3*
SESSION TRACE (301)
| TIMESTAMP | FILE ID | DURATION |
|---|---|---|
| $t_0$ | FILE A (56Kb/s) | 120 SEC |
| $t_1$ | FILE B (112Kb/s) | 600 SEC |
| $t_2$ | FILE A (56Kb/s) | 1 SEC |
| ⋮ | ⋮ | ⋮ |
| $t_n$ | FILE C (256Kb/s) | 180 SEC |
| ⋮ | ⋮ | ⋮ |
SEGMENT TRACE (302)
| TIMESTAMP | SEGMENT ID(S) |
|---|---|
| $t_0$ | FILE A segment_1 |
| $t_1$ | FILE A segment_2, FILE B segment_1 |
| $t_2$ | FILE A segment_3, FILE B segment_2, FILE A segment_1 |
| ⋮ | ⋮ |
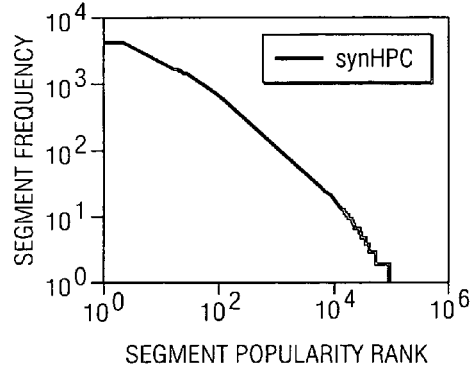
*FIG. 4*
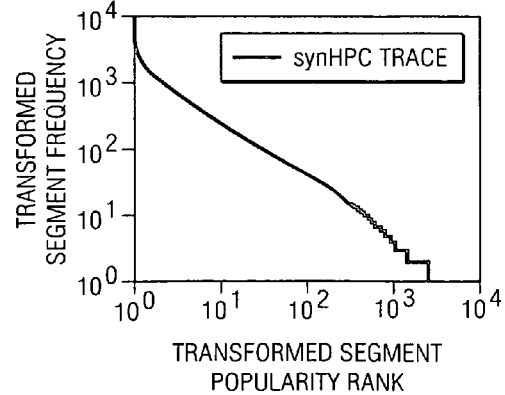
*FIG. 5*

US 7,925,738 B2

ANALYTICAL CACHE PERFORMANCE MODEL FOR A MEDIA SERVER

FIELD OF THE INVENTION

The following description relates in general to a technique for evaluating the cache performance of a streaming media server.

DESCRIPTION OF RELATED ART

An abundance of information is available on client-server networks, such as the Internet, Intranets, the World Wide Web (the "web"), other Wide and Local Area Networks (WANs and LANs), wireless networks, and combinations thereof, as examples, and the amount of information available on such client-server networks is continuously increasing. Further, users are increasingly gaining access to client-server networks, such as the web, and commonly look to such client-server networks (as opposed to or in addition to other sources of information) for desired information. For example, a relatively large segment of the human population has access to the Internet via personal computers (PCs), and Internet access is now possible with many mobile devices, such as personal digital assistants (PDAs), mobile telephones (e.g., cellular telephones), etc.

An increasingly popular type of technology for providing information to clients is known as "streaming media." In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before all of the file is received by the client, and as the received portion of the file is being presented, further portions of the file continue to be received by the client for later presentation. Thus, streaming media involves media (e.g., typically audio and/or video) that is transmitted from a server (e.g., a media server) to a client and begins playing on the client before fully downloaded.

Media servers are typically implemented for providing streaming media to clients. Such media servers may be implemented as a single server machine or as a "cluster." In general, a cluster is a group of nodes (e.g., servers and/or other resources) that appear to a user as a single system. For instance, a plurality of servers may be implemented as a cluster to form a single media server for serving streaming media files to requesting clients. While a plurality of different servers are used for servicing the clients' requests, to each client the cluster appears to be a single media server (i.e., it appears to the clients that they are accessing a single media server). Such cluster computing may be implemented to provide high availability (e.g., through redundancy provided by the plurality of nodes), parallel processing, and/or load balancing.

Various streaming media files may be provided concurrently by a media server to various different clients. That is, a plurality of clients may concurrently access streaming media files from the media server. Of course, limits exist as to how many concurrent streams a media server can support for a given client population. That is, limits exist as to the capacity of a media server, even a clustered media server, for supporting a given "workload" (i.e., a number of concurrent client accesses of streaming media from the media server).

BRIEF SUMMARY OF THE INVENTION

According to at least one embodiment, a method comprises receiving a session trace log identifying a plurality of sessions accessing streaming media files from a media server. The method further comprises deriving from the session trace log a segment trace log that identifies for each of a plurality of time intervals the segments of the streaming media files accessed, and using the segment trace log to develop an analytical cache performance model.

According to at least one embodiment, a method comprises receiving workload information representing client accesses of streaming media files from a media server, and using an analytical cache performance model to compute a cache hit ratio for the media server under the received workload.

According to at least one embodiment, a system comprises at least one media server, a pool of resources, and a resource manager. The system further comprises logic for computing a cache hit ratio for the at least one media server under a workload, wherein the resource manager dynamically determines an allocation of the resources for the at least one media server based at least in part on the computed cache hit ratio.

According to at least one embodiment, a system comprises means for receiving workload information representing client accesses of streaming media files from a media server. The system further comprises means for using a segment-based analytical cache performance model to compute a cache hit ratio for the media server under the received workload.

BRIEF DESCRIPTION OF THE DRAWINGS

FIGS. 1A-B each show an example utility computing system adapted to efficiently compute the cache hit ratio of a media server in accordance with one embodiment;

FIG. 2 shows an example flow for developing an analytical cache performance model in accordance with one embodiment;

FIG. 3 shows an example session trace for a given workload, as well as an example segment trace that may be derived from the session trace in accordance with one embodiment;

FIG. 4 shows the segment popularity distribution of an example synHPC trace on a log-log scale;

FIG. 5 shows the relationship between $x_k$ and $y_k$ of the example synHPC segment trace of FIG. 4 on a log-log scale after Zipf k-transformation;

DETAILED DESCRIPTION

Figure 1A:
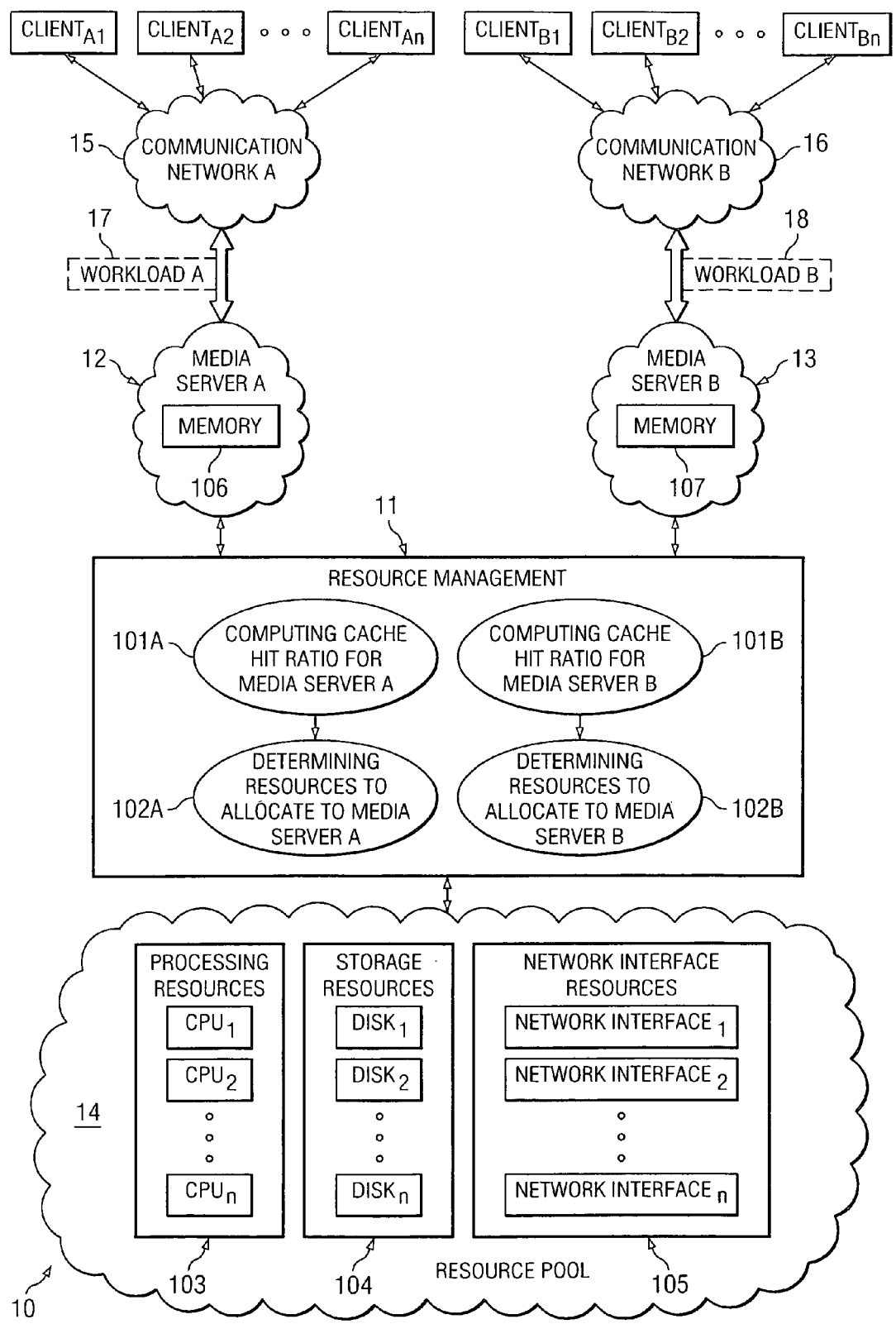

An emerging trend is the growing popularity of streaming media services. Streaming media often takes the form of video and audio clips from news, sports, entertainment, and educational sites, as examples. Streaming media is also gaining momentum in enterprise intranets for training purposes and company broadcasts. As used herein, a streaming media file is intended to encompass any type of file now known or later discovered that is served in a streaming fashion.

Streaming media workloads differ from traditional web workloads in many respects, thus presenting a number of challenges to system designers and media service providers (see e.g., M. Chesire, A. Wolman, G. Voelker, and H. Levy, "Measurement and Analysis of a Streaming-Media Workload," in *Proceedings of USITS*, March 2001; and L. Cherkasova and M. Gupta, "Characterizing Locality, Evolution, and Life Span of Accesses in Enterprise Media Server Workloads," in *Proceedings of NOSSDAV*, May 2002). For instance, transmitting media files generally requires more computing power, bandwidth and storage and is more sensitive to jitters in the system. Traditionally, service providers over-provision their sites to address highly bursty client access patterns. These access patterns can vary by an order of magnitude on an average day (see e.g., J. Chase, D. Anderson, P. Thakar, A. Vahdat, and R. Doyle, "Managing Energy and Server Resources in Hosting Centers," in *Proceedings of the 18th ACM SOSP*, October 2001) and by three orders of magnitude in the case of flash crowds. In fact, services are often most valuable exactly when the unexpected takes place (e.g., for communication of "breaking news" reports, etc.).

So-called "utility computing" offers a vision where large-scale hosting infrastructures can provide "resource-on-demand" capabilities to a variety of applications and services, where the services can request and release the computing resources from the underlying resource hosting infrastructure (resource utilities) to adapt to changing workloads and demands. An example of such a utility computing infrastructure is Hewlett-Packard Company's Utility Data Center (UDC), see http://www.hp.com/go/hpudc. In such a utility computing infrastructure, the resource utility may be implemented to use statistical multiplexing and efficient resource allocation to dynamically satisfy the requirements of services subject to highly bursty access patterns. Due to the burstiness and strict resource requirement of a streaming media service, the flexibility of utility computing offers a promising solution to host an Internet streaming media service on a resource utility.

Thus, next-generation media service hosting infrastructures may be implemented so as to dynamically allocate resources to a media server responsive to the media server's workload. For instance, a utility-aware media service that can request and release resources on demand in order to adapt to changing workloads is desirable. However, one challenging problem for implementing such a utility-aware service is determining the resources (e.g., computing, network, and storage resources) needed for supporting a given workload in a desired manner (e.g., in accordance with a service level objective (SLO) of the service). That is, in such a utility-aware implementation, it becomes desirable to map the service demand (i.e., the workload) to underlying resource demand (i.e., demand for resources for supporting the workload) so that desired performance goals can be satisfied. In other words, an efficient technique for determining the proper amount of resources to be allocated to a media server for supporting its workload in a desired manner (e.g., in compliance with an SLO) is desired for enabling implementation of a media server in an environment in which resources may be dynamically allocated, such as in a UDC.

As described further below, embodiments for efficiently computing the cache hit ratio of a media server under a workload are provided. More specifically, an analytical technique for computing the cache hit ratio of a media server under a given workload is provided. As further described below, once the cache hit ratio of a media server is determined, the amount of resources needed by the media server for supporting the workload in a desired manner (e.g., in accordance with an SLO) can be intelligently and efficiently estimated. Thus, embodiments for analytically computing the cache hit ratio of a media server under a given workload may be employed within a utility computing environment, such as a UDC, in which resources may be dynamically allocated and released for the media server. Of course, this novel technique for computing the cache hit ratio of a media server is not limited to application within a utility computing environment for use in determining the resources to allocate for the media server, but may be employed within any environment and for any application in which the computation of a cache hit ratio of a media server under a given workload is desired. Thus, while embodiments for computing the cache hit ratio of a media server have particular applicability within a utility computing environment, as described further below, application of the embodiments for computing the cache hit ratio described herein is not limited to use within a utility computing environment.

FIG. 1A shows an example utility computing system 10 adapted to efficiently compute the cache hit ratio of a media server. As shown, this example utility computing system 10 includes resource management logic (or "resource manager") 11, media server A 12, media server B 13, and resource pool 14. Resource pool 14 includes processing resources 103, such as central processing units (CPUs) $CPU_1, CPU_2, \ldots, CPU_n$ (wherein "n" is any number). Resource pool 14 also includes storage resources 104, such as disks $Disk_1, Disk_2, \ldots, Disk_n$ (wherein "n" is any number). Resource pool 14 further includes network interface resources 105, such as Network Interface$_1$, Network Interface$_2$, . . . , Network Interface$_n$ (wherein "n" is any number). Such network interfaces may be any type of interface to a communication network (e.g., the Internet) used by a media server for communicating streaming media to clients, including without limitation a T1 connection, T3 connection, ethernet connection, or any other connection now known or later developed for interfacing a media server with a communication network. Various other types of resources in addition to (or instead of) the resources shown in the example pool 14 of FIG. 1A may be included in the resource pool in alternative implementations of a utility computing system 10.

Resource manager 11 is operable to dynamically allocate/release resources of resource pool 14 for media server A 12 and media server B 13 in attempt to allow each of the media servers to support their respective workloads in a desired manner (e.g., to achieve their respective SLOs). That is, resource manager 11 determines how best to allocate the resources of resource pool 14 between media server A 12 and media server B 13 at any given time (e.g., based on the respective workloads and SLOs of media servers A 12 and B 13). For instance, as illustrated in the example of FIG. 1A, media server A 12 is communicatively coupled to communication network A 15 (e.g., via one or more of network interfaces 105) to communicate with clients, such as clients Client$_{A1}$, Client$_{A2}$, ..., Client$_{An}$ (wherein "n" is any number). Likewise, media server B 13 is communicatively coupled to communication network B 16 (e.g., via one or more of network interfaces 105) to communicate with its clients, such as clients Client$_{B1}$, Client$_{B2}$, ..., Client$_{Bn}$ (wherein "n" is any number). Communication networks A 15 and B 16 may each be, for example, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other.

As used herein, a media server (or "streaming media server") is intended to encompass any processor-based device now known or later developed that is capable of serving one or more streaming files to clients thereof. Of course, such a media server may be further operable to also serve other types of files (i.e., non-streaming files) to its clients. Each of media servers A 12 and B 13 may, at any given time, be serving one or more streams (streaming media files) to their respective clients. The streams being served by each media server at a given time is referred to herein as that server's "workload," such as workload A 17 for media server A 12 and workload B 18 for media server B 13 in the example of FIG. 1A.

Media server A 12 includes memory 106 and media server B 13 includes memory 107. Each of media servers A 12 and B 13 may have a plurality of different streaming media files that they can serve to their respective clients. Typically, streaming media files are stored to the disk resources of a media server, and the streaming media files (or portions thereof) that have been most recently served by the media server are stored to the server's memory resources. The files (or portions thereof) that reside in the server's memory may be served more efficiently than retrieving the files from the server's disk. There are different types of media servers available in the art. Examples of known media servers include RealNetwork™ Server 8, Windows™ Media Server, QuickTime™ Streaming Server available from Apple Computer, Inc. Media servers, such as RealNetwork™ Server 8, generally use the system's memory in servicing client requests. For instance, many media servers use the native operating system file buffer cache support for buffering recently accessed portions of files being served to clients. Files available in memory can generally be accessed more efficiently than those stored to disk. If the file is not available in memory, then the media server accesses its disk to retrieve the file. As the file (or currently needed portion thereof) is retrieved from disk, it is stored to memory and served to the requesting client. In this manner, many media servers use the system's memory (e.g., native operating system file buffer cache support) for buffering recently accessed portions of files being served to clients to enable later accesses to those portions of files that are stored to memory to be served more efficiently by the media server.

Recently, studies show that memory plays a important role in determining a media server's capacity for supporting a given workload. For instance, the sustained throughput (in terms of the number of concurrent streams supported by a media server) is generally about 3 to 5 times higher when those streams are served from memory than from disk (see e.g., L. Cherkasova and L. Staley, Building a Performance Model of Streaming Media Applications in Utility Data Center Environment," in *Proceedings of ACM/IEEE Conference on Cluster Computing and the Grid (CCGrid)*, May 2003). A typical media workload has a high degree of reference locality and exhibits a strong sharing pattern. Thus, a large percentage of the requested media contents can typically be served from memory. As used herein, "memory" (or "cache") includes application level cache and/or file system buffer cache, as examples.

Thus, memory (or "cache") effects are an important consideration when designing a utility-aware media service. That is, evaluation of the usage of a media server's memory resources for supporting a given workload is an important consideration in determining the resources to be allocated to such media server in a utility computing environment, such as in system 10 of FIG. 1A. As described further herein, the "hit ratio" of the memory (or "cache") of a media server may affect the amount of resources that should be allocated to the media server. When a stream (or portion thereof) can be served from the media server's memory, it is referred to as a "hit," while a stream (or portion thereof) that cannot be served from the media server's memory (and thus requires accessing the media server's disk) is referred to as a "miss." Thus, in general, the "hit ratio" provides a ratio of the amount of a workload that can be served from the media server's memory versus that amount of the workload that must be served from disk.

The cache size of a media server affects the hit ratio in supporting a given workload. For instance, a given media server with a larger cache can generally support more concurrent streams. As a result, to optimize that media server's capacity, its network bandwidth may need to be increased (e.g., to enable the larger number of concurrent connections that it can support). At the same time, the bandwidth requirement of the storage subsystem may be less (i.e., the bandwidth between the disk and a computing node may be less) because fewer accesses to disk by a computing node may be made if more accesses are served by memory. Because the cache hit ratio (which may also be referred to herein as "memory hit ratio") affects the network bandwidth and storage system requirements, estimating the cache hit ratio of media servers is an important step in determining the resource requirement of media services in a utility computing environment, such as the example system 10 of FIG. 1A.

In system 10 of FIG. 1A, resource manager 11 is operable to monitor the workloads of each of media server A 12 and B 13 and dynamically allocate the resources of resource pool 14 between those media servers in an appropriate manner. More specifically, resource manager 11 includes logic 101A for computing the cache hit ratio for media server A 12 under its workload A 17. Similarly, resource manager 11 includes logic 101B for computing the cache hit ratio for media server B 13 under its workload B 18. Resource manager 11 also includes logic 102A that is operable to use the computed cache hit ratio for media server A 12 (from logic 101A) to determine the resources from resource pool 14 to allocate to media server A 12. Likewise, resource manager 11 includes logic 102B that is operable to use the computed cache hit ratio for media server B 13 (from logic 101B) to determine the resources from resource pool 14 to allocate to media server B 13. Of course, logic 102A and 102B may be implemented to have knowledge of the allocation of resources desired by each of media server A 12 and media server B 13, and resource manager 11 may allocate the resources to ensure a proper balance of the resources in accordance with the SLO of each media server.

For example, assuming that 10 CPUs 103 are available for allocation between media servers A 12 and B 13 and further assuming that, based on the computed cache hit ratios of each of the media servers, logic 102A and 102B each determine that 6 CPUs are desired to be allocated to each of media servers A 12 and B 13. However, 6 CPUs are not available in pool 14 for allocation to each of media servers A 12 and B 13 (as only 10 total CPUs are available therein). Resource manager 11 may determine how best to allocate the CPUs that are available between the media servers. For example, resource manager 11 may balance the available CPUs by allocating 5 CPUs to each of the media servers, thus coming nearest to satisfying the desired number of CPUs for each media server but not fully satisfying the desire of either. On the other hand, suppose for example that media server A is a "gold" level member, while media server B is a "silver" level member (e.g., based on their respective service level agreements), resource manager 11 may decide to fully satisfy the desire of media server A 12 by allocating it the desired 6 CPUs, while allocating the remaining 4 CPUs to media server B 13. Any balancing strategy desired may be implemented on resource manager 11 in various different implementations of utility computing system 10.

In the example system 10 of FIG. 1A, an analytical technique, such as described further herein, is utilized by resource manager 11 in logic 101A and 101B for computing the cache hit ratios of media servers A 12 and B 13. By using such an analytical technique, resource manager 11 is capable of efficiently computing the cache hit ratios and determining the resources to allocate to each of media servers A 12 and B 13 to enable utility computing system 10 to quickly adapt to changing workloads for each of the media servers. Traditionally, one of three different methodologies are used in the performance analysis community: 1) an analytical model, 2) measurement, and 3) simulation. While measurement can be insightful, it incurs significant cost and time. Thus, measurement is too inefficient for many applications, such as for use in dynamically allocating resources in a utility computing environment. Further, measurement is not easily used to estimate a cache hit ratio of a media server before a media server is actually in place to, for example, determine a proper configuration (e.g., resources, etc.) to implement for the media server. That is, measurement is not easily used for estimating the cache hit ratio for an expected workload of a media server in order to, for example, determine the resources (e.g., disk bandwidth, CPU, network interface bandwidth, etc.) to allocate to such media server, as some type of pilot system would be needed for performing this type of measurement.

Similarly, experiences from our past research (see e.g., L. Cherkasova and W. Tang, "Capacity Planning Tool for Streaming Media Services," Submitted to *ACM Multimedia*, November 2003, and L. Cherkasova and W. Tang, "Cost-Aware Performance Model and Admission Control for Streaming Media Server in UDC Environment," Submitted to *ACM Multimedia*, November 2003) show that the simulation method is also too inefficient for many applications. For instance, simulation is time-consuming and cannot satisfy the real-time nature of dynamically allocating resources for a media server in a utility computing environment. However, embodiments described further herein provide an analytical model technique for efficiently computing the cache hit ratio of a media server under a given workload.

Turning to FIG. 1B, another example utility computing system is shown. System 20 is an example of a Utility Data Center (UDC) in which resources may be dynamically allocated. As with the example system 10 of FIG. 1A, UDC 20 may be used for implementing a media server complex in which resources are dynamically allocated for the media server responsive to the workload applied thereto based on the computed cache hit ratio of the media server. UDC 20 comprises data center management logic 21 that is operable to manage the allocation of resources in UDC 20. UDC 20 is coupled to a communication network, such as the Internet $22_A$ and/or Intranets $22_B$, thus enabling access by clients (not shown) via such communication networks. Network virtualization logic 23 and storage virtualization logic 28 is also included. UDC 20 further comprises cluster pool 24, network-attached storage (NAS) pool 25, load balancer pool 26, firewall pool 27, and storage pool 29. Again, data center management logic 21 is operable to manage the allocation of resources, such as resources available in cluster pool 24, NAS pool 25, and storage pool 29. More specifically, data center management logic 21 includes logic 101 for analytically computing the cache hit ratio (in the manner described further herein) for the media server(s) implemented thereon under their respective workloads, and logic 102 uses the computed cache hit ratio to determine the proper allocation of resources for each media service. Thus, data center management logic 21 may, using the computed cache hit ratios, dynamically allocate the appropriate resources for supporting the applied workload to each media server implemented in the UDC 20.

As described further below, an analytical cache hit ratio model can be used for efficiently computing the cache hit ratio of a media server. More specifically, certain embodiments described below provide an analytical "segment-based" model for efficiently estimating the segment hit ratio of a media server with a certain cache size. In general, a segment refers to a portion of a streaming media file that is served by a media server in a given time interval (e.g., in a one-second time interval). Thus, as described further below, a workload having a plurality of sessions (i.e., client accesses of streaming media files) can be represented as segment traces, wherein each segment identifies the portion(s) of streaming media file(s) served to the clients by the media server during a given time interval (e.g., one-second).

In accordance with one embodiment, a media workload of a session reference stream is converted to a segment reference stream. The segment reference stream is analyzed to estimate a segment-based cache hit ratio for a given cache size under the media workload. From such an analysis, the segment popularity distribution may be approximated. For instance, in an example analysis described further below, the segment popularity distribution of an example workload is approximated for an example media server by a generalized Zipf-like distribution. The analytical model may be used, for example, within a utility computing environment, such as the example environments of FIGS. 1A-1B above, for quickly searching the design space (e.g., the resource pool 14 of FIG. 1A) to find an optimal configuration for a media server under the constraints of underlying resource utilities. That is, the analytical segment-based model can be used, for example, in a utility computing environment in which the relationship of a cache size and expected hit ratio of a workload is desired to be determined very efficiently (e.g., in real time).

Embodiments are described herein for both 1) developing (deriving) an analytical cache performance model for a media server, and 2) using an analytical cache performance model for efficiently computing the cache hit ratio of a media server under a workload. It should be understood that the embodiments for using an analytical cache performance model for computing the cache hit ratio of a media server are not limited to analytical cache performance models that are developed in accordance with the example embodiments described herein for developing (deriving) such a model. An example technique for developing an analytical cache performance model is described below in connection with a specific analysis that we have performed for deriving one example analytical cache performance model for a media server. Thereafter, an example of using an analytical cache performance model for computing a cache hit ratio for a media server in accordance with one embodiment is further described (in addition to the example uses described above in connection with FIGS. 1A-1B).

I. Developing an Analytical Cache Performance Model

In accordance with one embodiment, an analytical cache performance model is developed for a media server according to the example flow of FIG. 2. As shown, session-level media traces are received in operational block 201. In general, each "session" corresponds to communication of a requested stream to a given client. For instance, with reference to FIG. 1A, media server A 12 may communicate a requested streaming file to $Client_{A1}$ in a first session, and media server A 12 may communicate a requested streaming file (either the same or a different file as that being communicated to $Client_{A1}$ in this example) to $Client_{A2}$. The sessions may overlap, wherein media server A 12 is concurrently serving the respective streaming files to each of $Client_{A1}$ and $Client_{A2}$. Thus, there is a separate session for each client to whom streaming media files are being served. Further, within a given workload a certain client (e.g., $Client_{A1}$) may, after being served a first streaming file, request another streaming file. In this case, each independent stream (e.g., the separate streams served to $Client_{A1}$) may be considered separate sessions. The session level traces may, in certain embodiments, be generated in block 201 to simulate an expected workload for a media server. For instance, such a workload may be generated using a workload generator as described in W. Tang, Y. Fu, L. Cherkasova, and A. Vahdat, "MediSyn: A Synthetic Streaming Media Service Workload Generator," in *Proceedings of NOSSDAV*, June 2003, the disclosure of which is hereby incorporated herein by reference.

From the session traces, segment reference streams are derived in operational block 202. For example, FIG. 3 shows an example session trace 301 for a given workload, as well as an example segment trace 302 that may be derived from session trace 301. In certain embodiments, session trace log 301 may be a synthetically generated workload for a media server, such as may be generated using the MediSyn workload generator. In other embodiments, session trace log 301 may be an actual past access log collected by a service provider. For instance, media service providers typically collect media server access logs, which reflect processed client requests and client activities at the site. A log of client accesses over a past period of say, 3 months to a year, may provide a representative "view" of the service provider's regular workload, and thus may be used as an "expected" workload for the service provider, which may be used in the manner described further below to derive an analytical cache performance model.

As shown in FIG. 3, the example session trace 301 includes a timestamp field that identifies when a given streaming file was requested by a client (or when the file began being served to the client), a file ID field that identifies a corresponding streaming file, and a duration field that identifies how long the file has been accessed (viewed) by a client. In the example of FIG. 3, at time to a streaming media file, a session corresponding to an access of File A on a streaming media server is identified (e.g., in response to a received client request for the file). The session for File A has a duration (or "elapsed access") of 120 seconds (i.e., 120 seconds of File A has been viewed by the client, although the total duration of File A may be much longer, for example 600 seconds) and is encoded at a bit rate of 56 Kb/s for transmission to the requesting client (the encoding bit rates of streaming media files are described further below). At time $t_1$ streaming media file, a session corresponding to an access of File B on the streaming media server is identified, wherein this session for accessing File B has a duration of 600 seconds (i.e., 600 seconds of File B has been viewed by the client so far) and is encoded at a bit rate of 112 Kb/s for transmission to the requesting client. At time $t_2$ streaming media file, a session corresponding to access of File A is again identified as being served by the streaming media server (e.g., to a different client than that of timestamp $t_0$), wherein such File A has a duration of 1 second (i.e., only 1 second of File A has been viewed so far) and is encoded at a bit rate of 56 Kb/s for transmission to this requesting client. Accordingly, various sessions of serving streaming files by the media server are identified in session trace log 301.

A media server may comprise streaming media files that are encoded for transmission at each of a plurality of different bit rates. For example, a particular content may be encoded for transmission at a plurality of different bit rates, such as 28 Kb/s, 56 Kb/s, and/or various other bit rates, wherein each encoded bit rate of the content may be expressed as a different file. Each file encoded for transmission at a given bit rate may be stored to data storage of the media server and the media server may be able to serve the appropriate one of such files as a stream to a client. In this case, the different encoded files may comprise substantially the same content (e.g., a given video or audio clip), but are encoded for transmission at different bit rates, and thus the quality of each file may differ. A media server generally attempts to serve the most appropriate encoded file to a client based at least in part on the client's access speed to the client-server network. For example, suppose a first client has a 28 Kb/s speed connection to the communication network (e.g., the Internet), a second client has a 56 Kb/s speed connection to the communication network, and a media server comprises File A encoded at 28 Kb/s and File B encoded at 56 Kb/s stored thereto that each have substantially the same content; when the first client requests this content, the media server typically attempts to serve File A to this first client (as File A is the highest-quality encoded file supportable by the first client's connection speed), and when the second client requests the content, the media server typically attempts to serve File B to this second client (as File B is the highest-quality encoded file supportable by the second client's connection speed).

As used herein, a file encoded for transmission at a particular bit rate may be referred to as a file encoded at the particular bit rate. In common phraseology in the art, a streaming media file is referred to as being "encoded at a particular bit rate", which means the file is encoded for transmission from the server at the particular bit rate. Thus, as used herein, the phrase "encoded at a bit rate" when describing a streaming media file means the streaming media file is encoded for transmission at the bit rate, as is consistent with common phraseology in the streaming media art.

As in operational block 202 of FIG. 2, session trace log 301 of FIG. 3 may be used to derive a segment trace log 302. In the example of FIG. 3, segment trace log 302 includes a timestamp field that identifies a reference time and a segment ID(s) field that identifies segments (e.g., portions) of streaming file(s) being served by the media server at the corresponding reference time. For instance, at time $t_0$, a first segment of File A (referred to as "File $A_{segment\_1}$") is being served by the media server. As can be seen in session trace 301, File A begins to be served at timestamp $t_0$. At time $t_1$ of segment trace 302, a second segment of File A (referred to as "File $A_{segment\_2}$") and a first segment of File B (referred to as "File $B_{segment\_1}$") are being served by the media server. As can be seen in session trace 301, File B begins to be served at timestamp $t_1$, and assuming that time $t_0$, $t_1$, $t_2$, etc. are one-second intervals, File A (having a duration of 120 seconds) is still being served by the media server at time $t_1$ when File B begins being served.

At time $t_2$ of segment trace 302, a third segment of File A (referred to as "File $A_{segment\_3}$"), a second segment of File B (referred to as "File $B_{segment\_2}$"), and a first segment of File A (referred to as "File $A_{segment\_1}$") are being served concurrently by the media server. As can be seen in session trace 301, File A begins to be served at timestamp $t_2$, and assuming that time $t_0$, $t_1$, $t_2$, etc. are one-second intervals, the earlier request for File A, as well as the request for File B, is still being served by the media server at time $t_2$ when File A begins being served to the requesting client.

Returning to FIG. 2, the derived segment reference streams, such as segment reference streams 302 in the example of FIG. 3, are used in block 203 to develop an analytical cache performance model. Considering that those segments that are accessed most often (i.e., the most popular segments) in a workload are likely to be memory accesses (because of their reference locality), the ratio of the number of accesses of the most popular segments to the total number of accesses of a workload provides an intelligent estimate of the cache hit ratio of a media server. In other words, the cache hit ratio H(C) of a media server for a given workload can be estimated by:

$$H(C) = \frac{\text{number of accesses to } C \text{ most popular segments}}{\text{number of accesses to } N \text{ segments}},$$

wherein C represents the number of unique segments that the media server's cache is capable of storing and N is the total number of segments accessed in the given workload. Thus, in accordance with one embodiment, an analytical cache performance model that provides the cache hit ratio H(C) is given by the following equation, which is described further below as equation (9):

$$H(C) = \frac{\sum_{i=1}^{C} NS(i)}{\sum_{i=1}^{N} NS(i)}.$$

As described further below, the popularity of segments accessed in the workload are ordered from most to least popular, wherein the number of accesses to a given segment Si are denoted as NS(i) and the total number of accesses in the segment trace (workload) is $$\sum_{i=1}^{N} NS(i).$$

That is, NS(i) represents the number of accesses to segment Si. The above equation can be simplified by considering that typical segment popularity distributions follow a general Zipf-like distribution. For instance, the ordered popularity for each segment in a workload is determined and stored for use in the above equation, and the above equation may be simplified to reduce this storage requirement through approximating the H(C) from a known popularity distribution that the H(C) follows, such as the general Zipf-like distribution. As described in grater detail below, most media site workloads have segment popularity distributions that follow a general Zipf-like distribution. Accordingly, the general Zipf-like distribution may be used to approximate the cache hit ratio H(C). In this manner, the H(C) equation may be simplified such that the parameter $\alpha$ for this generalized Zipf-like distribution is stored for use by the H(C) equation in place of the ordered popularity of all of the segments in a workload.

A specific example of developing an analytical cache performance model in accordance with certain embodiments is described further below. The model result is then verified with simulated cache performance in block 204.

In certain embodiments, the derived segment reference streams may be used to derive a segment popularity distribution. As mentioned above, in certain embodiments, the segment popularity distribution is approximated. For instance, an example analysis of a media server is provided below wherein the analysis reveals that the segment popularity distribution can be approximated by a general Zipf-like distribution. Simulation results are also described, which suggest that asymptotical segment hit ratio increases logarithmically or as a small power as a function of cache size for a variety of the synthetic workload with different streaming media properties. The example analysis provided below further demonstrates that the developed analytical model can estimate the segment hit ratio nicely for the media server under consideration. Thus, the analytical model allows utility service designers to quickly search the design space to find a optimal configuration under the consideration of resource constraints, price information, etc.

While the below analysis is used to develop an example analytical model for a given media server under consideration, this approach may be similarly used for developing other analytical models for media servers which can be used for efficiently computing the cache hit ratio of such media servers. Thus, embodiments described herein are not limited to the specific example analytical model developed below, but rather the development of the example analytical model below is intended as a framework that may be used for developing various other types of analytical models. Further, embodiments described herein are intended to encompass the use of analytical models, and particularly segment-based analytical models, for efficiently computing the cache hit ratio of a media server, irrespective of how such analytical models are developed.

Two metrics may be used for measuring cache performance: 1) hit ratio and 2) byte hit ratio. Hit ratio is the percentage of media requests served from a cache. Byte hit ratio is the percentage of bytes served from a cache.

Session hit ratio (which is equivalent to hit ratio in the web context) may be used to provide some insights on the capacity of systems (e.g., the number of concurrent sessions a system can support) and it is easily understood by service providers who have to make decisions on how many licenses they purchase and how many nodes they have to have (see e.g., L. Cherkasova and W. Tang, "Capacity Planning Tool for Streaming Media Services," Submitted to *ACM Multimedia*, November 2003, and L. Cherkasova and W. Tang, "Cost-Aware Performance Model and Admission Control for Streaming Media Server in UDC Environment," Submitted to *ACM Multimedia*, November 2003). However, byte hit ratio seems to be more appropriate in determining the requirement of lower level resources, such as network and disk bandwidth, at least for the following reasons:

A) A media session is typically much longer than the downloading of a web object. The amortized request overhead is much less for a media session than that of a typical web object downloading. For this reason, byte hit ratio is a more important factor to determine cache performance, both in terms of network, bandwidth, and storage system requirements.

B) The classification of a media session at the session level might not be accurate. Due to relatively longer duration of media sessions, it is highly likely that only a portion of the requested content is available in the cache, while the rest is served from disk. Classifying an entire session as either a memory stream (hit) or a disk stream (miss) inevitably leads to inaccuracies.

C) The classification of a media session is time-consuming by simulation. In order to classify a stream accurately, the simulator has to simulate a stream from start to end to make sure all the content of the stream is served from memory. In our experience, it typically takes a couple of hours to finish one simulation. While this might be sufficient for capacity planning purposes (which may be performed relatively infrequently and in which the results are typically not needed quickly, e.g., service providers can wait relatively long periods of time while designing a media server to be implemented for their site), utility computing environments have to make real time decisions regarding how best to allocate resources for supporting received workloads. Imagine that utility operators have to search thousands of system configuration combinations in real time in order to find the best configuration, simulations are too inefficient/slow to satisfy this desire.

Yet, developing an analytical model at session levels is quite challenging because a media workload is quite complex and it has a number of important properties that might affect the cache hit ratio. For instance, such properties as media file durations, session prefixes, and interactivities make such an analysis quite challenging. Different media workloads might have completely different file duration distributions (see e.g., L. Cherkasova and M. Gupta, "Characterizing Locality, Evolution, and Life Span of Accesses in Enterprise Media Server Workloads, in *Proceedings of NOSSDAV*, May 2002, and W. Tang, Y. Fu, L. Cherkasova, and A. Vahdat, "MediSyn: A Synthetic Streaming Media Service Workload Generator," in *Proceedings of NOSSDAV*, June 2003). Furthermore, session prefix distribution of a particular file depends on the file duration (see e.g., J. Almeida, J. Krueger, D. Eager, and M. Vernon, "Analysis of Educational Media Server Workloads," in *Proceedings of NOSSDAV*, June 2001, and W. Tang, Y. Fu, L. Cherkasova, and A. Vahdat, "Long-term Streaming Media Server Workload Analysis and Modeling," HP Laboratories, Tech. Rep. HPL-2003-23, February 2003). Also, media sessions might have interactivities. Because the analytical model at session levels may consider all of these properties in computing the cache hit ratio of a media server for a given workload, the analysis seems to be quite challenging.

Based on the above reasoning, an analytical, segment-based cache hit ratio model is developed in accordance with one embodiment, as described further below. On one hand, a segment-based model considers file duration, session prefixes and interactivities of media workloads seamlessly and intuitively, which makes development of an analytical model possible and much easier. On the other hand, segment hit ratio is equivalent to byte hit ratio if we assume that the encoding bit rates of media files are uniformly distributed. For these reasons, studying the cache performance at the segment level appears to be a reasonable abstraction and is attractive for its simplicity and intuititiveness.

In one example embodiment, a media server model is used for both the generation of a segment trace (e.g., in operational block 201 of FIG. 2) and the verification of the cache performance model (e.g., in operational block 204 of FIG. 2). More specifically, an event-driven, media server simulator that simulates a very simple, hypothesized media server is used in this example. This example media server simulator works as follows: The media server maintains a queue of active media sessions. Each newly arrived media session is added to the end of the queue. The media server serves active sessions in rounds. At each round, all the active media sessions are served in round-robin fashion according to the order in the queue. The media server serves one segment from each active session at a time. After one round, a global clock is advanced accordingly and the next round of serving starts. The server has a cache, which works at the segment level. The relative size of a segment is considered in cache replacement. In this example simulated media server, limitations on bandwidth resulting from network and disk constraints are not modeled, but the real-time constraint of media session delivery is considered in the model.

As described above, cache performance is strongly affected by reference locality. Reference locality states that files accessed recently are more likely to be accessed in the near future in a reference stream (see e.g., V. Almeida, A. Bestavros, M. Crovella, and A. de Oliveira, "Characterizing Reference Locality in the WWW," in *Proceedings of PDIS*, December 1996, and L. Cherkasova and G. Ciardo, "Characterizing Temporal Locality and its Impact on Web Server Performance," in *Proceedings of ICCCN*, October 2000). As described above with FIG. 3, a reference stream (or session trace) is a sequence of references (web requests, media sessions). Reference locality can be classified as temporal locality and spatial locality.

Spatial locality refers to the fact that files accessed close to each other (in time) are more likely to be accessed close to each other again in the future. For sequential media accesses, neighboring segments are delivered one after the other, creating the spatial locality in a segment reference stream. Thus, for example, File $A_{segment\_1}$ and File $A_{segment\_2}$ in the example of FIG. 3 can be considered as having spatial locality because those neighboring segments are delivered one after the other.

Temporal locality can be caused by skewed popularity distribution, and temporal correlation (see e.g., S. Jin and A. Bestavros, "Temporal Locality in Web Requests Streams: Sources, Charateristics, and Caching Implications," Department of Computer Science, Boston University, Tech. Rep. BUCS-TR-1999-009, August 1999). Temporal locality caused by skewed popularity distribution is that references for more frequently accessed files appear more close than those for infrequently accessed files in the reference stream. Temporal correlation is caused by the closeness of references to the same file even though the file access frequency might be the same in the reference stream. In order to study segment-based cache performance of media servers, segment reference streams are desired. In this example analysis, segment workloads are derived by generating media session reference streams (operational block 201 of FIG. 2), such as the example session reference stream 301 of FIG. 3, and after that, a hypothesized media server is used to derive segment reference streams (operational block 202 of FIG. 2), such as the example segment reference streams 302 of FIG. 3.

Compared with non-streaming web workloads, streaming media workloads are complicated. In order to study the segment hit ratio, the reference locality of a segment reference stream is analyzed. In this example analysis, those media properties that might affect either the number of segments or the reference order of segments are considered. These properties include (1) media file properties such as file duration and encoding bit rate and (2) media session properties such as popularity distribution and session prefix distribution.

Synthetic traces are generated in this example analysis by MediSyn (W. Tang, Y. Fu, L. Cherkasova, and A. Vahdat, "MediSyn: A Synthetic Streaming Media Service Workload Generator," in *Proceedings of NOSSDAV*, June 2003). The distributions and parameters used in the default synthetic trace (or "synHPC trace") generation are listed in Table 1 below.

TABLE 1

Parameters of the synHPC trace

| | |
|---|---|
| Number of Files | 800 |
| File Popularity Distribution | Zipf-like |
| Zipf-like α | 1.34 |
| Number of Requests | 41,703 |
| Workset | 41 GB |
| Session Arrival Process | Poisson |
| Session Arrival Rate | 1 session/sec |

Zipf-like distribution has been reported to fit the file popularity distribution of short-duration media traces (see M. Chesire, A. Wolman, G. Voelker, and H. Levy, "Measurement and Analysis of a Streaming-Media Workload," in *Proceedings of USITS*, March 2001, and L. Cherkasova and M. Gupta, "Characterizing Locality, Evolution, and Life Span of Accesses in Enterprise Media Server Workloads," in *Proceedings of NOSSDAV*, May 2002). In the example workload of Table 1, the file popularity follows a Zipf-like distribution and 90% of the requests go to 10% of the files. In this example, the HPC trace is collected from the Hewlett-Packard (HP) Corporate Media Solution site, which hosts diverse information about HP: video coverage of major events, keynote speeches, addresses and presentations, meetings with industry analysts, promotional events, etc. Thus, the trace represents typical media workloads in large enterprises. The duration distribution can be summarized by the following six classes: 20% of the files represent short videos of 0-2 minutes in duration, 10% of the videos are 2-5 minutes in duration, 13% of the videos are 5-10 minutes in duration, 23% are 10-30 minutes in duration, 21% have a duration of 30-60 minutes, and 13% of the videos are longer than 60 minutes in duration. Detailed prefix distribution is as described more fully in W. Tang, Y. Fu, L. Cherkasova, and A. Vahdat, "Long-term Streaming Media Server Workload Analysis and Modeling," HP Laboratories, Tech. Rep. HPL-2003-23, February 2003, the disclosure of which is hereby incorporated herein by reference. Basically, for this example analysis, the parameters are adapted from the real trace except the Zipf-like α value. For this reason, the trace is referred to as synHPC.

Our example study considers constant bit rate encodings for a file access, for simplicity. In this example, the file encoding bit rates are defined by the following discrete distribution: 5% of the files are encoded at 56 Kb/s, 20% of the files are encoded at 112 Kb/s, 50% of the files are encoded at 256 Kb/s, 20% of the files are encoded at 350 Kb/s, and 5% of the files are encoded at 500 Kb/s.

For simplicity, in this analysis a segment trace with segments of 1 second duration is derived (in operational block 202 of FIG. 2) for all the media sessions of the workload synHPC. After the segmentation, the segment trace has a total of 826,242 unique segments in this example analysis.

In this example analysis, the popularity distribution of both short term web workloads and streaming media workloads follow a Zipf-like distribution. Zipf-like distribution states that the access frequency of the i-th most popular file is proportional to $1/i^\alpha$. If the frequencies of files and the corresponding popularity ranks are plotted on a log-log scale, a Zipf-like distribution can be fitted by a straight line. A larger α implies more sessions are concentrated on the most popular files.

FIG. 4 shows the segment popularity distribution of the synHPC trace on a log-log scale. As can be seen, the distribution is not a Zipf-like distribution. In W. Tang, Y. Fu, L. Cherkasova, and A. Vahdat, "MediSyn: A Synthetic Streaming Media Service Workload Generator," in *Proceedings of NOSSDAV*, June 2003, a similar popularity distribution is seen and it is shown that the popularity distribution follows a generalized Zipf-like distribution. A generalized Zipf-like distribution is a natural extension of the Zipf-like distribution. It is expected that most media site workloads typically follow a generalized Zipf-like distribution. For completeness, a description about generalized Zipf-like distributions is presented here below.

A generalized Zipf-like distribution can be fitted by a straight line on a log-log scale after a Zipf k-transformation. The Zipf k-transformation for object popularity is defined as follows: assume x is an object popularity rank, y is the corresponding access frequency for the object, $k_x$ and $k_y$ are scale parameters, the k-transformation transforms the original x and y as follows:

$$x_k = \frac{x + k_x - 1}{k_x} \quad (1)$$

$$y_k = \frac{y + k_y - 1}{k_y} \quad (2)$$

After the k-transformation, $x_k$ and $y_k$ denote the transformed object popularity rank and frequency respectively.

FIG. 5 shows the relationship between $x_k$ and $y_k$ of the synHPC segment trace on a log-log scale after Zipf k-transformation. It should be observed that the line is reasonably straight. The α value (0.80) of the Zipf k-transformation is derived through linear regression. The coefficient of determination $R^2$ measures the accuracy of a regression. If $R^2=1$, the model is perfect. A larger $R^2$ implies a more accurate model. In our example analysis, the $R^2$ value is 0.99, which indicates a very good fit. This shows that the segment popularity distribution can be approximated by a generalized Zipf-like distribution.

The intuition behind a generalized Zipf k-transformation can be explained as follows. In the trace, the object ranks can be divided into a number of equal-size bins. Each bin has $k_x$ objects with similar access frequency. Similar explanation can be applied to $k_y$ and $y_k$ as well. The popoularity bin index $x_k$ and frequency bin index $y_k$ follows Zipf-like distribution.

The rationale of a Zipf k-transformation for a media segment trace can be explained as follows. Media segment popularity is contributed by both the skewed file popularity distribution and the skewed segment popularity distribution within the same file (prefix distribution). In the trace, if we denote the number of accesses to the i-th file as NF(i), the number of accesses to j-th segment of the i-th file as NS(i, j) and the session duration as d, then $$NS(i,j) = NF(i) * P(d \geq j) \quad (3)$$

$P(d \geq j)$ in the above equation is the probability that session duration is at least j segments long.

Media file popularity typically follows a Zipf-like distribution. If we assume the total number of sessions in the trace is M. Then, the number of accesses to file i in the trace is:

$$NF(i) = M/i^\alpha \quad (4)$$

On the other hand, a number of media workload analyses have shown prefix probability density function f(d) of a media file can be fitted by a Pareto distribution (see e.g., J. Almeida, J. Krueger, D. Eager, and M. Vernon, "Analysis of Educational Media Server Workloads," in *Proceedings of NOSSDAV*, June 2001, and W. Tang, Y. Fu, L. Cherkasova, and A Vahdat, "Long-term Streaming Media Server Workload Analysis and Modeling," HP Laboratories, Tech. Rep. HPL-2003-23, February 2003). That is, $$f(d) = \beta * d^{(-(\beta+1))} \quad (5)$$

where d is the duration of a session.

Thus, the cumulative density function F(d) of f(d) is $$F(d) = 1 - 1/d^{\beta} \quad (6)$$

Based on the above two equations, we can compute:

$$P(d>=j) = 1 - P(d<j) = 1 - F(j) = 1/j^{\beta} \quad (7)$$

$$NS(i,j) = M/i^{\alpha} * 1/j^{\beta} \quad (8)$$

According to Formula 8 above, different combinations of i and j might result in a number of segments with equal popularity. In one extreme case, if all of the files have the same duration d and all the segments within a file are accessed uniformly, then $k_x = d$ and the Zipf-like parameter is $\alpha$. In another extreme case, if all of the files have the same popularity and duration, then $k_x = n$ (wherein n is the total number of files in the trace) and the Zipf-like parameter is $\beta$. For all other cases, we use a linear regression to determine both $k_x$ and $\alpha$ in accordance with one embodiment.

Continuing with the above example analysis of the workload of Table 1, an analytical cache performance model can be derived (as in operational block 203 of FIG. 2). More specifically, in this example an analytical cache performance model is derived based on the assumption that the segment popularity distribution follows a generalized Zipf-like distribution. Of course, in other situations the segment popularity distribution may follow another type of distribution (e.g., a Pareto distribution), and any such type of segment popularity distribution may be used in a similar manner for deriving an analytical cache performance model. As described further below, we verified the derived analytical model through the generated segment trace (as in operational block 204 of FIG. 2), and the results for our example analysis indicate that the derived analytical model can estimate the asymptotic cache performance in an expected operational region nicely.

It has been shown that an independent reference model and Zipf-like popularity distribution can estimate the asymptotic web proxy performance for web requests (see e.g., L. Breslau, P. Cao, L. Fan, G. Phillips, and S. Shenker, "Web Caching and Zipf-like Distributions: Evidence, and Implications," in *Proceedings of INFOCOM*, March 1999). Because we realized in the above example analysis that the segment popularity distribution can be approximated by a generalized Zipf-like distribution, we wanted to know if the cache performance of media servers can be estimated in a similar way. Thus, we considered the finite cache of C segments subject to an infinitely long segment reference stream. The number of unique segments is N. Assume that the cache can hold C segments regardless of the size of each segment. Further assume that the cache holds the C most popular segments as indicated by order i. This ordering is determined by measuring the segment request frequency for each segment in the trace, which is equivalent to assuming that the cache has a Perfect-LRU cache replacement policy.

The accesses to segment S are denoted as NS(i) and the total number of accesses in the segment trace is $$\sum_{i=1}^{N} NS(i).$$

The asymptotic hit ratio H(C) is given by:

$$H(C) = \frac{\sum_{i=1}^{C} NS(i)}{\sum_{i=1}^{N} NS(i)} \quad (9)$$

Given the intuition of the Zipf k-transformation, H(C) can be approximated $$H(C) \approx \frac{k_k \sum_{i=1}^{\frac{C}{x_k}} NS(ix_k)}{k_k \sum_{i=1}^{\frac{N}{x_k}} NS(ix_k)} \quad (10)$$

Thus, $$H(C) = \frac{\sum_{i=1}^{\frac{C}{X_k}} NS(ix_K)}{\sum_{i=1}^{\frac{N}{X_k}} NS(ix_K)} \quad (11)$$

The popularity of the sequence of segments $S_{ix_k}$ follows a Zipf-like distribution with the same parameter $\alpha$ as that of the generalized Zipf-like distribution of the popularity of all the segments in the trace, with popularity rank of i. Hence, $$H(C) = \frac{\sum_{i=1}^{\frac{C}{k_x}} NS(ik_x)}{\sum_{i=1}^{\frac{N}{k_x}} NS(ik_x)} = \frac{M \sum_{i=1}^{\frac{C}{k_x}} \frac{1}{i^{cx}}}{M \sum_{i=1}^{\frac{N}{k_x}} \frac{1}{i^{cx}}} \quad (12)$$

In the case where $\alpha = 1$, then asymptotically $$\sum_{i=1}^{\frac{C}{k_x}} \frac{1}{i^{\alpha}} \approx \log \frac{C}{k_x} \quad (13)$$

and for $0 < \alpha < 1$, then asymptotically $$\sum_{i=1}^{\frac{C}{k_x}} \frac{1}{i^{\alpha}} \approx \left(\frac{C}{k_x}\right)^{1-\alpha} \quad (14)$$

Therefore, in the case of α=1, then asymptotically $$H(C) \approx \frac{\log\frac{C}{k_x}}{\log\frac{N}{k_x}} = \frac{\log C - \log k_x}{\log N - \log k_x} \quad (15)$$

and for 0<α<1, then asymptotically $$H(C) \approx \frac{\left(\frac{C}{k_x}\right)^{1-\alpha}}{\left(\frac{N}{k_x}\right)^{1-\alpha}} = \frac{C^{1-\alpha}}{N^{1-\alpha}} \quad (16)$$

The above analysis shows that the segment hit ratio in this example increases logarithmically or as a small power as a function of the cache size. In order to verify if the above model can qualitatively estimate the cache performance, both the Perfect-LFU (Least Frequently Used) policy and LRU (Least Recently Used) cache replacement policy are implemented in the media server simulator. The performance simulation is run against the synHPC segment trace.

Figure 6:
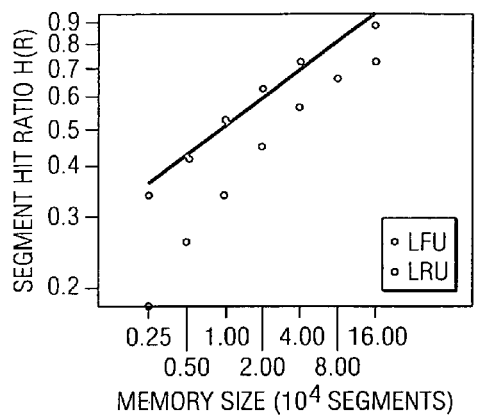
FIG. 6 shows the performance results of both Perfect-LFU (Least Frequently Used) and LRU (Least Recently Used) policies of the example synHPC trace on a log-log plot.

FIG. 6 shows the performance results of both Perfect-LFU and LRU of the synHPC trace on a log-log plot. The hit ratio H(C) shown on the log-log scale is roughly linear in the middle. As with the H(C) data, this suggests that $H(C) \approx C^\beta$ for some β. In our study, we computed a linear fit of the log performance data to find β and then computed α=1−β. The computed α value of synHPC trace is 0.77. The value is quite consistent with the α value of the segment trace (the α value is 0.80). Thus, the simple analytical model that was derived above is successful in predicting the asymptotic behavior of H(C). The performance curve flattens out at a large cache size.

Under the independent reference model, Perfect-LFU is the best online algorithm. From FIG. 6, it can be seen that LFU significantly outperforms LRU. This indicates that the cache performance is dominated by the popularity distribution of the segments in a segment trace.

In our study, we then checked whether the changes in media workload properties at the session level (e.g., changes in the properties of Table 1) invalidate the model we developed above. Thus, as described further below, we changed different workload properties, and the derived analytical model still held true for estimating the cache hit ratio.

Figure 7:
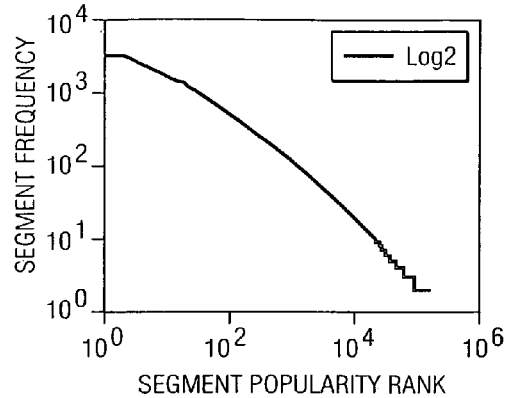
FIG. 7 shows the segment popularity distribution of another example trace (referred to herein as the Log 2 Trace) on a log-log scale.
Figure 8:
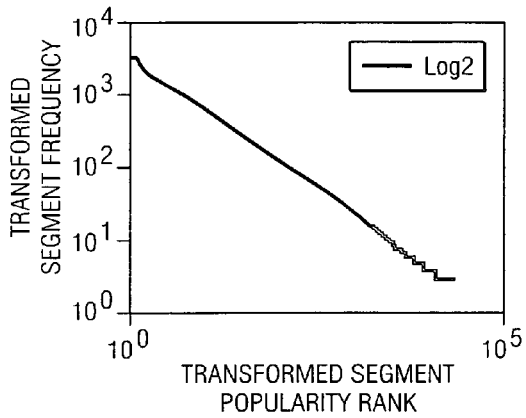
FIG. 8 shows the segment popularity distribution of the Log 2 Trace of FIG. 7 after Zipf k-transformation.

In order to validate that a generalized Zipf-like distribution can approximate the segment frequency distribution of segment traces, we generated a new trace (Log 2, for simplicity) with Zipf-like parameter α value of 1.22 for file popularities (as opposed to the Zipf-like parameter α value of 1.34 in Table 1). Other properties of the media workload remained the same as the default workload synHPC of Table 1. FIG. 7 shows the segment popularity distribution on a log-log scale. FIG. 8 shows the segment popularity distribution after Zipf k-transformation. We applied a similar method as that described above to derive the parameter and the α value is 0.72 and $R^2$ value is 0.98.

Figure 9:
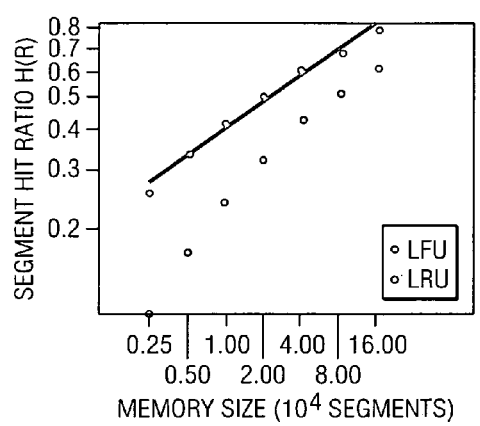
FIG. 9 shows the simulated cache performance of the Log 2 Trace on a log-log scale.

The cache performance of the Log 2 Trace on a log-log scale is shown in FIG. 9. Again the middle part follows a straight line. The computed α value is 0.73, which is consistent with the original segment popularity parameter of 0.72.

In order to check whether the arrival rate of media sessions has a big impact on cache performance and undermines the analytical model itself, we generated two additional traces with different session arrival rates. One log (Log 3) has session inter-arrival time of 10 seconds. The other log (Log 4) has session inter-arrival time of 500 seconds. Other properties of the two workloads remain the same as that of the default media workload (of Table 1). Additionally, the segment popularity distribution of both Log 3 and Log 4 are the same as that of the default workload.

Table 2 below shows the cache hit ratio of LFU for three different traces analyzed in our study. Table 3 shows the cache hit ratio of LRU for the same traces. As Tables 2 and 3 show, different session arrival rates do not have a big impact on the cache performance with either LFU or LRU replacement policy.

TABLE 2

Cache Hit Ratio Of Traces synHPC, Log3, Log4 with LFU

| Mem Size(GB) | synHPC | Log3 | Log4 |
|---|---|---|---|
| 0.125 | 0.43 | 0.42 | 0.41 |
| 0.25 | 0.54 | 0.52 | 0.51 |
| 0.5 | 0.62 | 0.60 | 0.59 |
| 1 | 0.69 | 0.68 | 0.70 |
| 2 | 0.75 | 0.71 | 0.73 |
| 4 | 0.77 | 0.76 | 0.76 |
| 8 | 0.79 | 0.78 | 0.78 |
| 16 | 0.82 | 0.79 | 0.81 |

TABLE 3

Cache Hit Ratio of Traces synHPC, Log3, Log4 with LRU

| Mem Size(GB) | synHPC | Log3 | Log4 |
|---|---|---|---|
| 0.125 | 0.30 | 0.24 | 0.27 |
| 0.25 | 0.40 | 0.34 | 0.37 |
| 0.5 | 0.55 | 0.46 | 0.49 |
| 1 | 0.63 | 0.58 | 0.60 |
| 2 | 0.71 | 0.69 | 0.69 |
| 4 | 0.78 | 0.73 | 0.76 |
| 8 | 0.79 | 0.79 | 0.81 |
| 16 | 0.82 | 0.79 | 0.81 |

Figure 10:
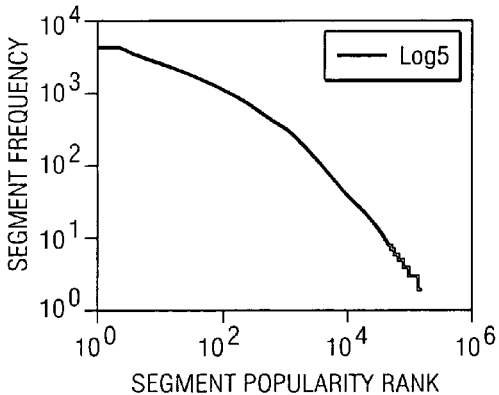
FIG. 10 shows the segment popularity distribution of another example trace (referred to herein as the Log 5 trace) on a log-log scale.
Figure 11:
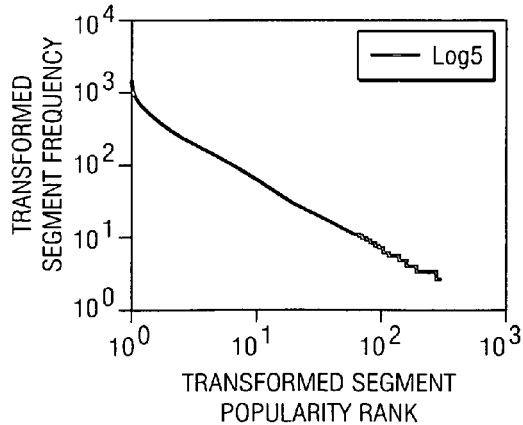
FIG. 11 shows the segment popularity distribution of the Log 5 trace of FIG. 10 after Zipf k-transformation.

In our study, we next generated a new synthetic trace (Log 5), which has different file duration distribution than that of the default trace (of Table 1). The file duration distribution used for Log 5 is the same as the HPL trace (see L. Cherkasova and M. Gupta, "Characterizing Locality, Evolution, and Life Span of Accesses in Enterprise Media Server Workloads," in *Proceddings of NOSSDAV*, May 2002). In that trace, the percentage of longer duration files is higher. FIG. 10 shows the segment popularity distribution of this Log 5 trace on a log-log scale. FIG. 11 shows the segment popularity distribution of the Log 5 trace after Zinf k-transformation. We applied similar method as that described above to derive the parameter and α value is 0.98 and $R^2$ value is 0.99.

Figure 12:
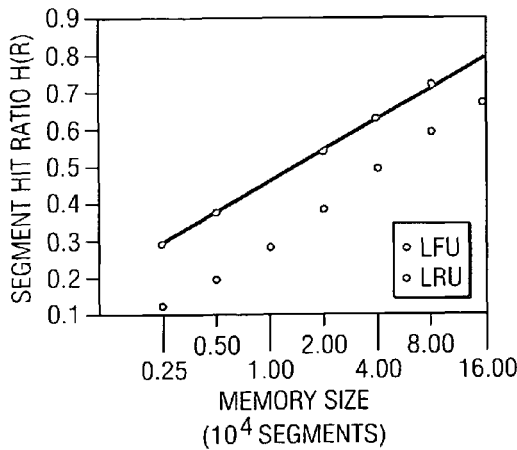
FIG. 12 shows the simulated cache performance of the Log 5 trace on a log-log scale.

The cache performance of the Log 5 trace on a log-log scale, is shown in FIG. 12. The curve is fitted by a straight line quite well. Because the segment popularity distribution Zipf parameter is almost 1, only the X-axis is in long scale in FIG. 12.

As described above, an analytical segment-based cache hit ratio model can be derived for media servers and used for efficiently computing the cache hit ratio under a given workload. Our above study shows that segment popularity distribution of media workloads can typically be approximated by a generalized Zipf-like distribution. Combined with the independent reference model (where each segment in the trace is accessed independently), we developed an analytical model for asymptotical segment hit ratio of media servers in our example study. The analytical model can estimate asymptotical segment cache hit ratio in an expected operational region nicely. Through simulation, we verified, in our example study, that segment cache hit ratio increases logarithmically or as a small power as a function of cache size for a variety of generated synthetic media workloads mimicking real media workload properties. The analytical model allows utility service designers and resource utility operators to quickly search the design space to find the optimal configuration under the constraints of underlying resource utilities.

Figure 13:
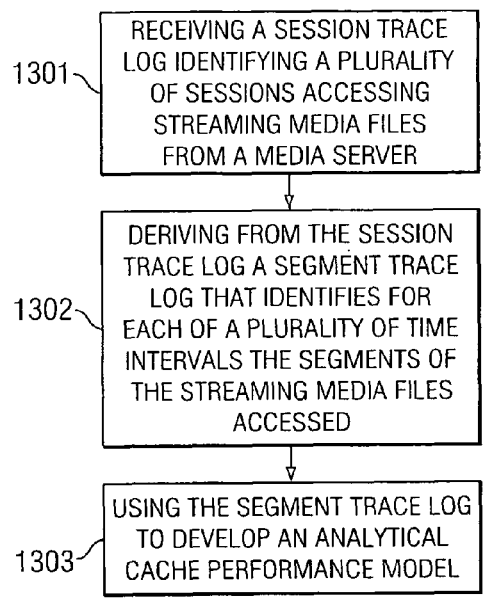
FIG. 13 shows an example operational flow for deriving an analytical cache performance model in accordance with at least one embodiment.

While a specific example study is described in detail above, embodiments described herein are not limited to the above example for deriving an analytical cache performance model. Rather, other techniques for deriving an analytical cache performance model may be used. FIG. 13 shows an example operational flow for deriving an analytical cache performance model in accordance with at least one embodiment. In operational block 1301, a session trace log is received that identifies a plurality of sessions accessing streaming media files from a media server, such as the example session trace log 301 of FIG. 3. In operational block 1302, a segment trace log is derived from the session trace log, wherein the segment trace log identifies for each of a plurality of time intervals the segments of the streaming media files accessed, such as the example segment trace log 302 of FIG. 3.

In operational block 1303, the segment trace log is used to develop an analytical cache performance model. Again, in general, the cache hit ratio H(C) of a media server for a given workload can be estimated by:

$$H(C) = \frac{\text{number of accesses to } C \text{ most popular segments}}{\text{number of accesses to } N \text{ segments}},$$

wherein C represents the number of number of accesses to N segments unique segments that the media server's cache is capable of storing and N is the total number of segments accessed in the given workload. As described above, in certain embodiments, the H(C) equation is approximated by using a generalized Zipf-like distribution for representing the popularity distribution of the segments in a media server's typical workload.

II. Use of an Analytical Cache Performance Model for Computing Cache Hit Ratio

Figure 14A:
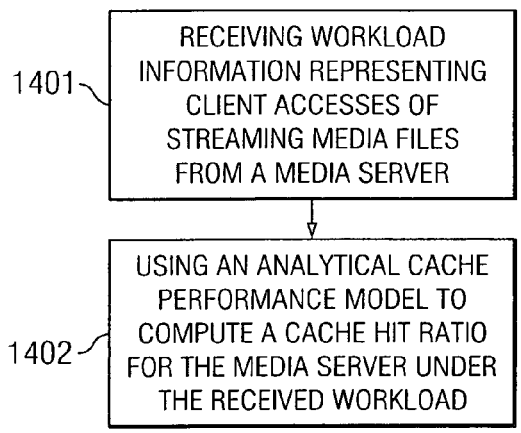
FIG. 14A shows an example operational flow for using an analytical cache performance model in accordance with at least one embodiment.

Additionally, irrespective of how such an analytical cache performance model is derived, in certain embodiments such model may be used to efficiently compute a cache hit ratio for a media server. FIG. 14A shows an example operational flow for using an analytical cache performance model in accordance with at least one embodiment. In operational block 1401, workload information representing client accesses of streaming media files from a media server is received. For instance, a session trace 301 (of FIG. 3) may be received, from which the segment trace 302 can be derived. From such segment trace 302 for the workload, the total number N of accesses to segments and the popularity distribution of the segments in the workload can be determined (e.g., NS(i) can be determined).

In operational block 1402, the analytical cache performance model is used to compute a cache hit ratio for the media server under the received workload. For instance, equation (9) above for computing the H(C) may be used to efficiently compute the cache hit ratio for the media server.

Figure 14B:
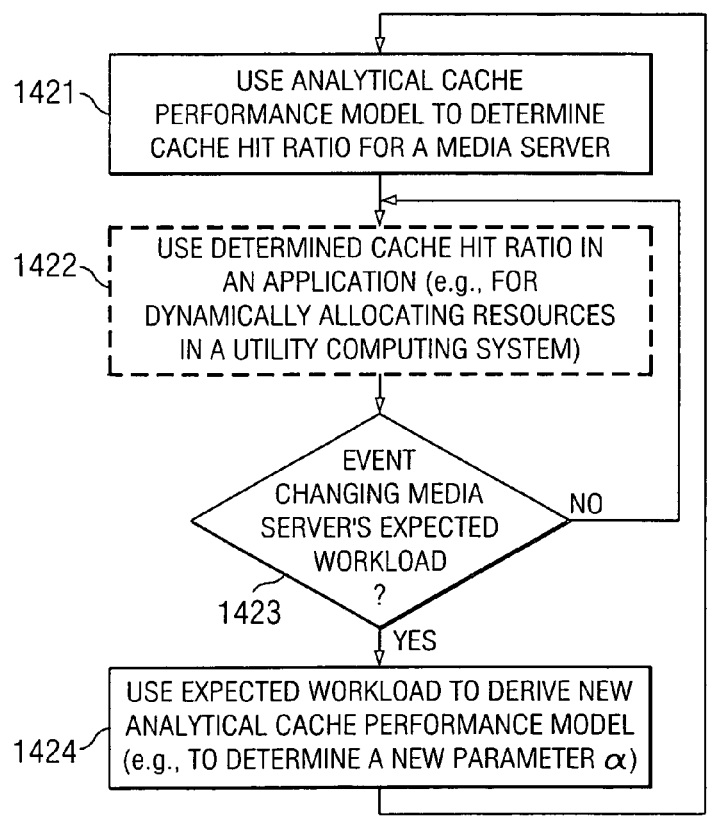
FIG. 14B shows an operational flow for another example of using an analytical cache performance model in accordance with at least one embodiment.

FIG. 14B shows another example operational flow for using an analytical cache performance model in accordance with certain embodiments. In this example, an analytical cache performance model is used in operational block 1421 to compute (estimate) a cache hit ratio for a media server. For instance, an analytical cache performance model that is approximated from a generalized Zipf-like distribution may be used for computing the cache hit ratio of a media server. More specifically, a parameter $\alpha$ may be determined (e.g., through linear regression) by analysis of an expected workload for a media server (e.g., based on past collected access logs for the media server), and such parameter $\alpha$ may be used in the analytical cache performance model for the media server for estimating the server's cache hit ratio (e.g., in accordance with one of equations 15 and 16 above). In operational block 1422, the determined cache hit ratio may be used in an application, such as for a resource manager dynamically resources in a utility computing system.

In block 1423, a determination is made whether an event has been encountered that may change the media server's expected workload. For instance, the media server's workload may be periodically re-evaluated (in which case the event encountered would be an elapsed time period since the last evaluation of the workload) or some other event may be encountered that may cause a change in the media server's workload. If such an event is encountered, then in block 1424, the newly expected workload is used to derive a new analytical cache performance model. For instance, the media server's past access logs may be periodically evaluated to determine a proper parameter $\alpha$ for use in approximating the popularity distribution of segments in the analytical cache hit ratio equation for the media server. Thereafter, operation returns to block 1421 whereat the newly developed analytical cache performance model (e.g., having the new $\alpha$ parameter approximating the expected segment popularity distribution for the media server's workload) is used in determining the cache hit ratio for the media server.

Thus, in the above examples of FIGS. 14A-14B, the cache hit ratio of a media server can be estimated efficiently through solving such H(C) equation. If traditional simulation techniques are used to determine the cache hit ratio of a media server, the amount of time required for completing the simulation is typically long (e.g., several hours) and the time varies depending on the received workload and the size of the media server's cache. With the analytical cache performance model, on the other hand, an equation, such as the above-described H(C) equation, can be used to efficiently compute (or estimate) the cache hit ratio irrespective of the size of the workload and/or cache. That is, the time for solving H(C) remains relatively constant across different workloads and cache sizes. Because the cache hit ratio can be efficiently computed for a media server using this analytical cache performance model, this enables a media server to be implemented in a utility computing environment, such as those of FIGS. 1A-1B, wherein a resource manager can compute the cache hit ratio (using this analytical cache performance model) for a given workload encountered by the media server and determine the resources to allocate for the media server in real time. In certain embodiments, the analytical model provides a curve from which for any given cache size the cache hit ratio can be determined. In the case of simulation, each cache size requires a simulation which typically lasts for a couple of hours. Further, with simulation, if a utility operator desires to determine the cache hit ratio under 10 different cache sizes, the operator needs to run 10 simulations, and for 1,000 different cache sizes the operation is required to run 1,000 different simulations. Accordingly, use of an analytical cache performance model in a utility computing environment is much more efficient for estimating the cache hit ratio for any given cache size.

The computed cache hit ratio can then be used in any suitable application. For instance, as described above in connection with FIGS. 1A-1B, the cache hit ratio may be used by a resource manager (e.g., resource manager 11 of FIG. 1A) for efficiently searching a design space (e.g., resource pool 14) for dynamically allocating resources to a media server for supporting an applied workload. The cache hit ratio computed through the above-described analytical model may not be an exact ratio for a given workload, but instead provides an intelligently determined estimate, which is sufficiently accurate for many applications. For instance, the estimated cache hit ratio for a media server under an applied workload from an analytical cache performance model (such as the above-described H(C)) is sufficiently accurate to enable a resource manager of a utility computing system to intelligently determine how many resources to allocate to the media server. Again, this intelligent estimation of a cache hit ratio can be computed much more quickly than simulation or measurement techniques, and thus the efficiently obtained cache hit ratio estimate may be preferable in many applications to a much slower computation technique (such as simulation or measurement) even if the slower computation technique provides a more precise computation.

When implemented via computer-executable instructions, various elements of embodiments described herein for deriving an analytical cache performance model and/or for using such an analytical cache performance model for computing the cache hit ratio of a media server are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 15:
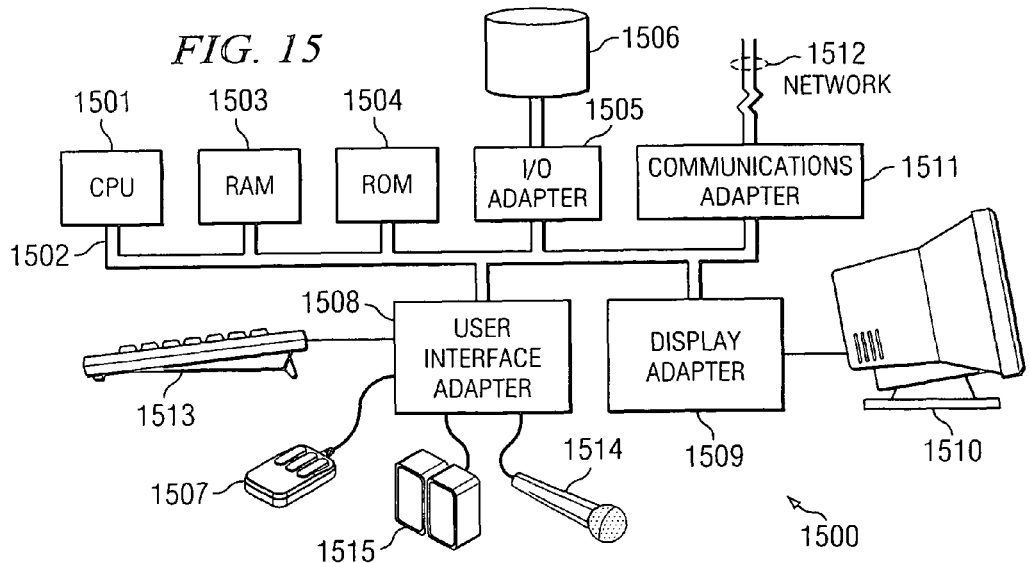
FIG. 15 shows an example computer system adapted according to an embodiment for deriving and/or using an analytical cache performance model in the manner described herein.

FIG. 15 illustrates an example computer system 1500 adapted according to an embodiment for deriving and/or using an analytical cache performance model in the manner described above. For instance, example computer system 1500 may be used in simulating a media server and performing other operations described above for deriving an analytical cache performance model. Similarly, example computer system 1500 may be used to implement a resource manager in a utility computing environment, such as resource manager 11 of FIG. 1A, and such computer system 1500 may use an analytical cache performance model to compute a cache hit ratio for a media server. Central processing unit (CPU) 1501 is coupled to system bus 1502. CPU 1501 may be any general purpose CPU. The above-described embodiments for deriving and/or using an analytical cache performance model of a media server are not restricted by the architecture of CPU 1501 as long as CPU 1501 supports the inventive operations as described herein. CPU 1501 may execute the various logical instructions according to embodiments described herein. For example, CPU 1501 may execute machine-level instructions according to the exemplary operational flows described above in conjunction with FIG. 13 for deriving an analytical cache performance model and/or FIG. 14 for using an analytical cache performance model for computing a cache hit ratio for a media server.

Computer system 1500 also preferably includes random access memory (RAM) 1503, which may be SRAM, DRAM, SDRAM, or the like. Computer system 1500 preferably includes read-only memory (ROM) 1504 which may be PROM, EPROM, EEPROM, or the like. RAM 1503 and ROM 1504 hold user and system data and programs, as is well known in the art.

Computer system 1500 also preferably includes input/output (I/O) adapter 1505, communications adapter 1511, user interface adapter 1508, and display adapter 1509. I/O adapter 1505, user interface adapter 1508, and/or communications adapter 1511 may, in certain embodiments, enable a user to interact with computer system 1500 in order to input information thereto.

I/O adapter 1505 preferably connects storage device(s) 1506, such as one or more of hard drive, compact disc (CD) drive, floppy disk drive, tape drive, etc. to computer system 1500. The storage devices may be utilized when RAM 1503 is insufficient for the memory requirements associated with storing data for application programs. RAM 1503, ROM 1504, and/or storage devices 1506 may be used for storing computer-executable code for deriving and/or using an analytical cache performance model for a media server in accordance with the embodiments described above. Communications adapter 1511 is preferably adapted to couple computer system 1500 to network 1512.

User interface adapter 1508 couples user input devices, such as keyboard 1513, pointing device 1507, and microphone 1514 and/or output devices, such as speaker(s) 1515 to computer system 1500. Display adapter 1509 is driven by CPU 1501 to control the display on display device 1510.

It shall be appreciated that the embodiments described herein for deriving and using an analytical cache performance model are not limited to the architecture of system 1500. For example, any suitable processor-based device may be utilized, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments described above.

What is claimed is:

1. A method comprising:
  receiving, by a computer, a session trace log identifying a plurality of sessions accessing streaming media files;
  deriving, by the computer, from the session trace log a segment trace log that identifies, for each of a plurality of time intervals, the segments of said streaming media files accessed;
  determining, by the computer, the number of accesses in the session trace made to each of the C unique segments that are most popular;
  determining, by the computer, a total number of accesses in the session trace made to segments;
  using, by the computer, the segment trace log to develop an analytical cache performance model,
  providing, by the computer, the analytical cache performance model to a media server to enable the media server to dynamically determine an allocation of non-memory resources based on a cache hit ratio computed using the analytical cache performance model;
  wherein said analytical cache performance model computes a cache hit ratio based at least in part on the determined number of accesses to each of the C unique segments that are most popular and the determined total number of accesses in the session trace made to segments,
  wherein said analytical cache performance model computes the cache hit ratio H(C) as:

$$H(C) = \frac{\text{number of accesses to } C \text{ most popular segments}}{\text{total number of accesses to segments}}.$$

2. The method of claim 1 further comprising:

approximating a popularity distribution of segments accessed in the session trace log by a generalized Zipf-like distribution.

3. A method comprising:

receiving, by a media server, workload information representing client accesses of streaming media files; and using, by the media server, a segment-based analytical cache performance model to compute a cache hit ratio for the media server under the received workload, dynamically determining, by the media server, an allocation of non-memory resources based on the computed cache hit ratio;

wherein the segment-based analytical cache performance model is developed for use by the media server by:

receiving a session trace log identifying a plurality of sessions accessing streaming media files;

deriving from the session trace log a segment trace log that identifies, for each of a plurality of time intervals, the segments of said streaming media files accessed;

determining the number of accesses in the session trace made to each of the C unique segments that are most popular;

determining a total number of accesses in the session trace made to segments;

using the segment trace log to develop the segment-based analytical cache performance model;

wherein the segment-based analytical cache performance model computes a cache hit ratio based at least in part on the determined number of accesses to each of the C unique segments that are most popular and the determined total number of accesses in the session trace made to segments, wherein said segment-based analytical cache performance model computes the cache hit ratio H(C) as:

$$H(C) = \frac{\text{number of accesses to } C \text{ most popular segments}}{\text{total number of accesses to segments}}.$$

4. The method of claim 3 further comprising verifying said segment-based analytical cache performance model prior to its use by the media server.

5. The method of claim 3 wherein said using said segment-based analytical cache performance model comprises solving:

$$H(C) = \frac{\sum_{i=1}^{C} NS(i)}{\sum_{i=1}^{N} NS(i)},$$

wherein H(C) is the cache hit ratio, C is a number of unique segments that a memory of the media server has capacity to store, N is the total number of segments accessed in a workload, and accesses to segment S are denoted as NS(i).

6. The method of claim 3 further comprising: determining whether an event is encountered for changing an expected workload of said media server.

7. The method of claim 6 wherein if said event is encountered, further comprising:

using the changed expected workload of said media server to determine a new analytical cache performance model; and using the new analytical cache performance model for estimating the cache hit ratio of said media server.

8. The method of claim 3 further comprising:

using the computed cache hit ratio of said media server in an application.

9. The method of claim 8 wherein said application comprises a resource allocation application.

10. The method of claim 3 wherein said segment-based analytical cache performance model computes the cache hit ratio H(C) as:

$$H(C) = \frac{\sum_{i=1}^{C} NS(i)}{\sum_{i=1}^{N} NS(i)},$$

wherein C is a number of unique segments that a memory of the media server has capacity to store, N is the total number of segments accessed in a workload, and accesses to segment S in the streaming media workload are denoted as NS(i).

11. A system comprising:

at least one media server;

a pool of non-memory resources;

a resource manager; and logic for computing a cache hit ratio for said at least one media server under a streaming media workload, said cache hit ratio is based on an analytical cache performance model, wherein the resource manager dynamically determines an allocation of said non-memory resources for said at least one media server based at least in part on the computed cache hit ratio, wherein the analytical cache performance model is developed by:

receiving a session trace log identifying a plurality of sessions accessing streaming media files;

deriving from the session trace log a segment trace log that identifies, for each of a plurality of time intervals, the segments of said streaming media files accessed;

determining the number of accesses in the session trace made to each of the C unique segments that are most popular;

determining a total number of accesses in the session trace made to segments;

using the segment trace log to develop the analytical cache performance model;

wherein the analytical cache performance model computes a cache hit ratio based at least in part on the determined number of accesses to each of the C unique segments that are most popular and the determined total number of accesses in the session trace made to segments, wherein said analytical cache performance model computes the cache hit ratio H(C) as:

$$H(C) = \frac{\text{number of accesses to } C \text{ most popular segments}}{\text{total number of accesses to segments}}.$$

12. The system of claim 11 wherein said logic for computing a cache hit ratio computes the cache hit ratio H(C) as:

$$H(C) = \frac{\sum_{i=1}^{C} NS(i)}{\sum_{i=1}^{N} NS(i)},$$

wherein C is a number of unique segments that a memory of the media server has capacity to store, N is the total number of segments accessed in a workload, and accesses to segment S are denoted as NS(i).

13. The system of claim 11 wherein a popularity distribution of segment accesses in said workload follows a generalized Zipf-like distribution having a parameter α and said logic for computing a cache hit ratio computes the cache hit ratio H(C) as:

$$H(C) \approx \frac{\log C - \log k_x}{\log N - \log k_x} \text{ if } \alpha = 1, \text{ and as}$$

$$H(C) \approx \frac{C^{1-\alpha}}{N^{1-\alpha}} \text{ for } 0 < \alpha < 1,$$

wherein C is a number of unique segments that a memory of the media server has capacity to store and N is a total number of unique segments accessed in the workload and k is a scale parameter.

14. A system comprising:
means for receiving workload information representing client accesses of streaming media files from a media server; and
means for using a segment-based analytical cache performance model to compute a cache hit ratio for the media server under the received workload,
means for dynamically determining an allocation of non-memory resources based on the computed cache hit ratio;
wherein the segment-based analytical cache performance model is developed by:
receiving a session trace log identifying a plurality of sessions accessing streaming media files;
deriving from the session trace log a segment trace log that identifies, for each of a plurality of time intervals, the segments of said streaming media files accessed;
determining the number of accesses in the session trace made to each of the C unique segments that are most popular;
determining a total number of accesses in the session trace made to segments;
using the segment trace log to develop the analytical cache performance model;
wherein the analytical cache performance model computes a cache hit ratio based at least in part on the determined number of accesses to each of the C unique segments that are most popular and the determined total number of accesses in the session trace made to segments,
wherein said analytical cache performance model selectively computes the cache hit ratio H(C) as:

$$H(C) = \frac{\text{number of accesses to } C \text{ most popular segments}}{\text{total number of accesses to segments}}.$$

15. The system of claim 14 wherein said segment-based analytical cache performance model computes the cache hit ratio H(C) as:

$$H(C) = \frac{\sum_{i=1}^{C} NS(i)}{\sum_{i=1}^{N} NS(i)},$$

wherein C is a number of unique segments that a memory of the media server has capacity to store, N is the total number of segments accessed in a workload, and accesses to segment S in the workload are denoted as NS(i).

16. The system of claim 14 wherein a popularity distribution of segment accesses in said workload follows a generalized Zipf-like distribution having a parameter .alpha., and said segment-based analytical cache performance model computes the cache hit ratio H(C) as:

$$H(C) \approx \frac{\log C - \log k_x}{\log N - \log k_x} \text{ if } \alpha = 1, \text{ and as}$$

$$H(C) \approx \frac{C^{1-\alpha}}{N^{1-\alpha}} \text{ for } 0 < \alpha < 1,$$

wherein C is a number of unique segments that a memory of the media server has capacity to store and N is a total number of unique segments accessed in the workload and $k_x$ is a scale parameter.

17. A non-transitory computer-readable medium that stores software code for execution by a processor, when executed the software code causes the processor to:
receive workload information representing client accesses of streaming media files;
use a segment-based analytical cache performance model to compute a cache hit ratio for the media server under the received workload; and
dynamically determine an allocation of non-memory resources based on the computed cache hit ratio,
wherein the segment-based analytical cache performance model is developed by:
receiving a session trace log identifying a plurality of sessions accessing streaming media files;
deriving from the session trace log a segment trace log that identifies, for each of a plurality of time intervals, the segments of said streaming media files accessed;
determining the number of accesses in the session trace made to each of the C unique segments that are most popular;
determining a total number of accesses in the session trace made to segments;
using the segment trace log to develop the analytical cache performance model;
wherein the analytical cache performance model computes a cache hit ratio based at least in part on the determined number of accesses to each of the C unique segments that are most popular and the determined total number of accesses in the session trace made to segments,
wherein said analytical cache performance model selectively computes the cache hit ratio H(C) as:

$$H(C) = \frac{\text{number of accesses to } C \text{ most popular segments}}{\text{total number of accesses to segments}}.$$

18. The computer-readable medium of claim 17, when executed said code further causes the processor to determine said cache hit ratio H(C) as:

$$H(C) = \frac{\sum_{i=1}^{C} NS(i)}{\sum_{i=1}^{N} NS(i)},$$

wherein N is the total number of segments accessed in a workload and accesses to segment S in the workload are denoted as NS(i).

\* \* \* \* \*

UNITED STATES PATENT AND TRADEMARK OFFICE
CERTIFICATE OF CORRECTION

| | | |
|---|---|---|
| PATENT NO. | : 7,925,738 B2 | Page 1 of 1 |
| APPLICATION NO. | : 10/740276 | |
| DATED | : April 12, 2011 | |
| INVENTOR(S) | : Wenting Tang et al. | |

It is certified that error appears in the above-identified patent and that said Letters Patent is hereby corrected as shown below:

In column 27, line 27, in Claim 13, delete "k" and insert -- $k_x$ --, therefor.

In column 28, line 14, in Claim 16, delete ".alpha.," and insert -- $\alpha$, --, therefor.

Signed and Sealed this
Sixth Day of September, 2011

David J. Kappos
*Director of the United States Patent and Trademark Office*